(12) United States Patent
Houle et al.

(10) Patent No.: US 7,641,583 B2
(45) Date of Patent: Jan. 5, 2010

(54) HYBRID DRIVE TRAIN FOR VEHICLE

(75) Inventors: Martin Houle, Laval (CA); Pierre Blouin, Boucherville (CA); Louis-Philippe Bibeau, Chambly (CA); Jianhong Xu, Longueuil (CA); Ghislain Lambert, Beloeil (CA); Philippe Noël, Beloeil (CA)

(73) Assignee: TM4 Inc., Boucherville, Quebec (CA)

( * ) Notice: Subject to any disclaimer, the term of this patent is extended or adjusted under 35 U.S.C. 154(b) by 375 days.

(21) Appl. No.: 10/555,201

(22) PCT Filed: May 27, 2004

(86) PCT No.: PCT/CA2004/000790

§ 371 (c)(1), (2), (4) Date: Sep. 6, 2006

(87) PCT Pub. No.: WO2004/106096

PCT Pub. Date: Dec. 9, 2004

(65) Prior Publication Data

US 2008/0096717 A1     Apr. 24, 2008

(30) Foreign Application Priority Data

May 30, 2003  (CA) .................................. 2430157

(51) Int. Cl.
*B60W 10/02*    (2006.01)
*B60W 10/04*    (2006.01)
*B60K 6/20*     (2007.10)
*B60K 6/442*    (2007.10)
*H02P 15/00*    (2006.01)
*H02P 15/02*    (2006.01)

(52) U.S. Cl. ................ 477/5; 477/6; 477/8; 477/12; 477/13; 180/65.21; 180/65.23; 903/912; 903/914; 903/946; 192/48.2

(58) Field of Classification Search ............... 477/5, 477/6, 12, 13; 180/65.2, 65.3; 903/912, 903/914, 946; 192/48.1, 48.2
See application file for complete search history.

(56) References Cited

U.S. PATENT DOCUMENTS 2,791,131 A     5/1957  Boughner ................... 475/203

(Continued)

FOREIGN PATENT DOCUMENTS

DE          209 519       12/1906

(Continued)

OTHER PUBLICATIONS

Office Action issued in U.S. Appl. No. 11/291,117, mailed Aug. 7, 2008.

(Continued)

*Primary Examiner*—Tisha D Lewis
(74) *Attorney, Agent, or Firm*—Fulbright & Jaworski L.L.P.

(57) ABSTRACT

A first aspect of the present invention is concerned with a series hybrid drive train for a vehicle comprising a traction motor, an electric generator, a three-position clutch (20) and a controller. The three-position clutch allows the generator to be connected to an internal combustion engine (12) of the vehicle, to the traction motor or to remain freewheeling. In a second aspect of the present invention, a four-position clutch is used to further allow the internal combustion engine to be connected directly to the wheels to thereby yield a series/parallel drive train. A third aspect of the present invention is concerned with a method of operating such a hybrid drive train.

31 Claims, 4 Drawing Sheets

U.S. PATENT DOCUMENTS

| | | | | |
|---|---|---|---|---|
| 3,390,749 | A | | 7/1968 | Pospisil et al. ......... 192/84.941 |
| 4,335,429 | A | | 6/1982 | Kawakatsu .................. 701/102 |
| 4,588,040 | A | | 5/1986 | Albright, Jr. et al. ........ 180/165 |
| 5,492,189 | A | | 2/1996 | Kriegler et al. ............ 180/65.2 |
| 5,586,613 | A | * | 12/1996 | Ehsani ...................... 180/65.2 |
| 5,668,424 | A | | 9/1997 | Lamb ........................ 310/103 |
| 5,691,588 | A | | 11/1997 | Lutz et al. ..................... 310/92 |
| 5,773,904 | A | | 6/1998 | Schiebold et al. ............. 310/92 |
| 5,827,148 | A | * | 10/1998 | Seto et al. ..................... 477/15 |
| 5,838,085 | A | * | 11/1998 | Roesel et al. ............... 310/113 |
| 6,098,770 | A | | 8/2000 | Isley ........................... 195/35 |
| 6,107,761 | A | * | 8/2000 | Seto et al. ................... 318/139 |
| 6,223,842 | B1 | | 5/2001 | Masaki ...................... 180/65.2 |
| 6,455,947 | B1 | * | 9/2002 | Lilley et al. ............... 290/40 C |
| 6,705,416 | B1 | | 3/2004 | Glonner et al. ............ 180/65.2 |
| 6,962,545 | B2 | * | 11/2005 | Larkin ........................... 475/5 |
| 7,513,349 | B2 | * | 4/2009 | Houle et al. ............... 192/48.2 |
| 2005/0275225 | A1 | | 12/2005 | Bertolotti ..................... 290/44 |
| 2007/0119678 | A1 | | 5/2007 | Houle et al. ............... 192/48.2 |

FOREIGN PATENT DOCUMENTS

| | | |
|---|---|---|
| JP | 06144020 | 5/1994 |
| JP | 08-512450 | 12/1996 |
| JP | 10-014171 | 1/1998 |
| JP | 2002-059752 | 2/2002 |
| JP | 2002-087080 | 3/2002 |
| JP | 2002/542752 | 12/2002 |
| WO | WO 00/63041 | 10/2000 |
| WO | WO 2004/037594 | 5/2004 |
| WO | WO 2004/106096 | 12/2004 |

OTHER PUBLICATIONS

Office Action issued in U.S. Appl. No. 11/291,117, mailed Nov. 26, 2007.

* cited by examiner

HYBRID DRIVE TRAIN FOR VEHICLE

This application is a national phase application under 35 U.S.C. § 371 of International Application No. PCT/CA2004/000790 filed May 27, 2004, which claims priority to Canadian Application No. 2,430,157 filed May 30, 2003. The contents of these applications are incorporated by reference.

FIELD OF THE INVENTION

The present invention relates to drive trains for vehicles. More specifically, the present invention is concerned with a hybrid drive train and to modes of operations of such a drive train.

BACKGROUND OF THE INVENTION

Vehicles having a hybrid drive train are well known in the art. They are usually provided with an internal combustion engine (ICE), an electric traction motor that may transmit power to at least one wheel of the vehicle and an electric generator used to supply electricity to the traction motor and/or to recharge batteries of the vehicle.

On the one hand, a hybrid drive train is said to be a series hybrid drive train when the traction motor is used to drive the wheels and the ICE is exclusively used to drive the electric generator to recharge the vehicle's batteries and/or supply electric power directly to the traction motor.

On the other hand, a hybrid drive train is said to be a parallel hybrid drive train when both the traction motor and the ICE may be used simultaneously or individually to drive the wheels of the vehicle. In parallel hybrid drive trains, the ICE may also be used to recharge the batteries through the electric generator.

Series/parallel hybrid vehicles (SPHV) are also known in the art. Conventionally, these vehicles include drive trains that may be switched between a series mode and a parallel mode, as described hereinabove.

Early parallel hybrid drive included electric motors associated with the front wheels and an ICE associated with the rear wheels. This arrangement has the drawback of taking much space in the vehicle.

Often, parallel hybrid drive trains include an interconnection between the ICE, the traction motor and the electric generator. This interconnection is often provided by a planetary gear assembly. A drawback of such an interconnection is its mechanical complexity and inherent inefficiency.

OBJECTS OF THE INVENTION

An object of the present invention is therefore to provide an improved hybrid drive train for vehicle.

SUMMARY OF THE INVENTION

More specifically, in accordance with the present invention, there is provided a hybrid drive for a vehicle including at least one driving wheel; said hybrid drive comprising:
an engine having an output shaft;
an electric motor having an output shaft connected to the at least one driving wheel;
an electric motor/generator having an output/input shaft;
a clutch assembly selectively interconnecting said output/input shaft of said electric motor/generator to said output shaft of said engine and to said output shaft of said electric motor; said clutch assembly being actuatable between a first position where said output/input shaft is connected to said output shaft of the electric motor to thereby supplement the electric motor by using said motor/generator as a motor, a second position where said output/input shaft is connected to said output shaft of said engine to thereby use said electric motor/generator as an electric generator, and a third position where said output/input shaft is freewheeling;
a controller so connected to said electric motor, said electric motor/generator and said clutch assembly as to control their operation.

A hybrid drive for a vehicle including at least one driving wheel and an engine having an output shaft; said hybrid drive comprising:
an electric traction motor having an output shaft connected to the at least one driving wheel;
an electric motor/generator having an output/input shaft;
a clutch assembly selectively interconnecting said output/input shaft of said electric motor/generator to the output shaft of the engine and to said output shaft of said electric motor; said clutch assembly being actuatable between a first position where said output/input shaft is connected to said output shaft of the electric motor to thereby supplement the electric motor by using said motor/generator as a motor, a second position where said output/input shaft is connected to the output shaft of the engine to thereby use said electric motor/generator as an electric generator, and a third position where said output/input shaft is freewheeling; and
a controller so connected to said electric motor, said electric motor/generator and said clutch assembly as to control their operation.

A clutch assembly for a hybrid drive of a vehicle including at least one driving wheel, an engine having an output shaft, an electric motor having an output shaft associated with the at least one driving wheel, an electric motor/generator having an output/input shaft and a controller so connected to the electric motor, the electric motor/generator and said clutch assembly as to control their operation; said clutch assembly selectively interconnecting the output/input shaft of the electric motor/generator to the output shaft of the engine and to the output shaft of the electric motor; said clutch assembly being actuatable between a first position where the output/input shaft is connected to the output shaft of the electric motor, a second position where the output/input shaft is connected to the output shaft of the engine, and a third position where the output/input shaft is freewheeling.

A method for operating a drive train of a hybrid vehicle provided with user controls, an ICE, a traction motor, an electric generator and a clutch assembly selectively interconnecting the electric generator to the ICE and to the traction motor; said method including the steps of:
providing a controller connected to the user controls to receive data therefrom, to the ICE and to the clutch assembly;
providing at least one sensor for sensing at least one characteristic of the hybrid vehicle; the at least one sensor supplying sensed data to the controller; and
via the controller, controlling the clutch assembly so as to interconnect the electric generator either to the ICE and to the traction motor, depending on the data supplied from the at least one sensor and from the user controls.

It is to be noted that the expressions "neutral state", "mechanical power generating state" and "electrical power generating state" used herein and in the appended claims refer to the state of the generator of the drive train and not to the state of the drive train, as will easily be understood by one skilled in the art.

Other objects, advantages and features of the present invention will become more apparent upon reading of the following non-restrictive description of preferred embodiments thereof, given by way of example only with reference to the accompanying drawings.

DETAILED DESCRIPTION

Generally stated, a first aspect of the present invention is concerned with a series hybrid drive train for a vehicle comprising a traction motor (in the form of an electric motor), an electric generator (in the form of an electric motor/generator), a three position clutch and a controller. The three position clutch allows the generator to be connected to an ICE of the vehicle, to the traction motor. or to remain freewheeling. In a second aspect of the present invention, a four position clutch is used to further allow the ICE to be connected directly to the wheels to thereby yield a series/parallel hybrid drive train. A third aspect of the present invention is concerned with the modes of operation of such hybrid drive trains.

Figure 1:
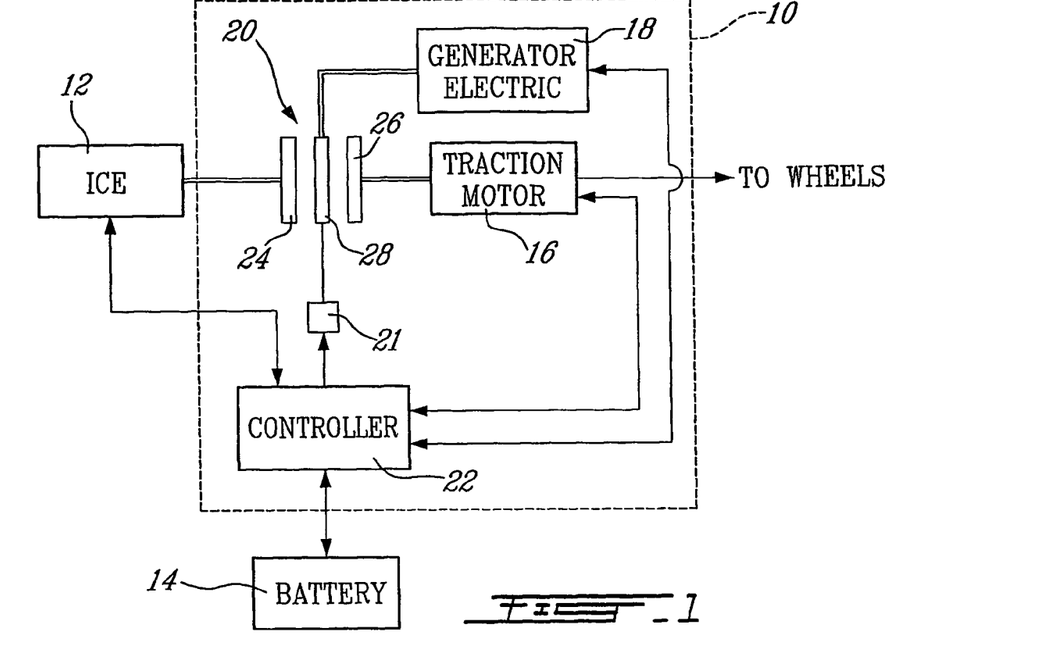
FIG. 1 is a schematic view of a hybrid drive train according to an embodiment of the present invention, shown in a neutral state.

Turning now to FIG. 1 of the appended drawings, there is provided a hybrid drive train 10 to which an ICE 12, a battery 14 and wheels (not shown) of the vehicle may be directly or indirectly connected.

The drive train 10 includes a traction motor 16, an electric generator 18, a three-position clutch 20 a disk actuating mechanism 21 and a controller 22 connected to the ICE 12, the battery 14, the traction motor 16, the electric generator 18 and the disk actuating mechanism 21. The controller 22 may thus control the entire drive train 10 and send and receive data about the operational state of the ICE and the state of charge of the battery 14.

The three position clutch 20 includes a first disk 24 connected to the shaft of the ICE 12, a second disk 26 connected to the shaft of the traction motor 16 and a movable disk 28 connected to the shaft of the electric generator 18. The disk actuating mechanism 21 is controlled by the controller 22 and includes mechanical elements (not shown) to move the movable disk 28 between its three positions. The disk moving arrangement may operate via magnetism, a fork or a solenoid, for example.

It is to be noted that FIG. 1 is very schematic. Many other components are required to operate the drive train 10. For example, the controller 22 includes power electronics (not shown). Similarly, the battery 14, the traction motor 16 and the electric generator 18 all include different sensors to supply data to the controller 22.

FIG. 1 shows the drive train 10 in a neutral state, i.e. that the shaft of electric generator 18, connected to the movable disk 28, is freewheeling. This is the default state of the drive train 10.

Figure 2:
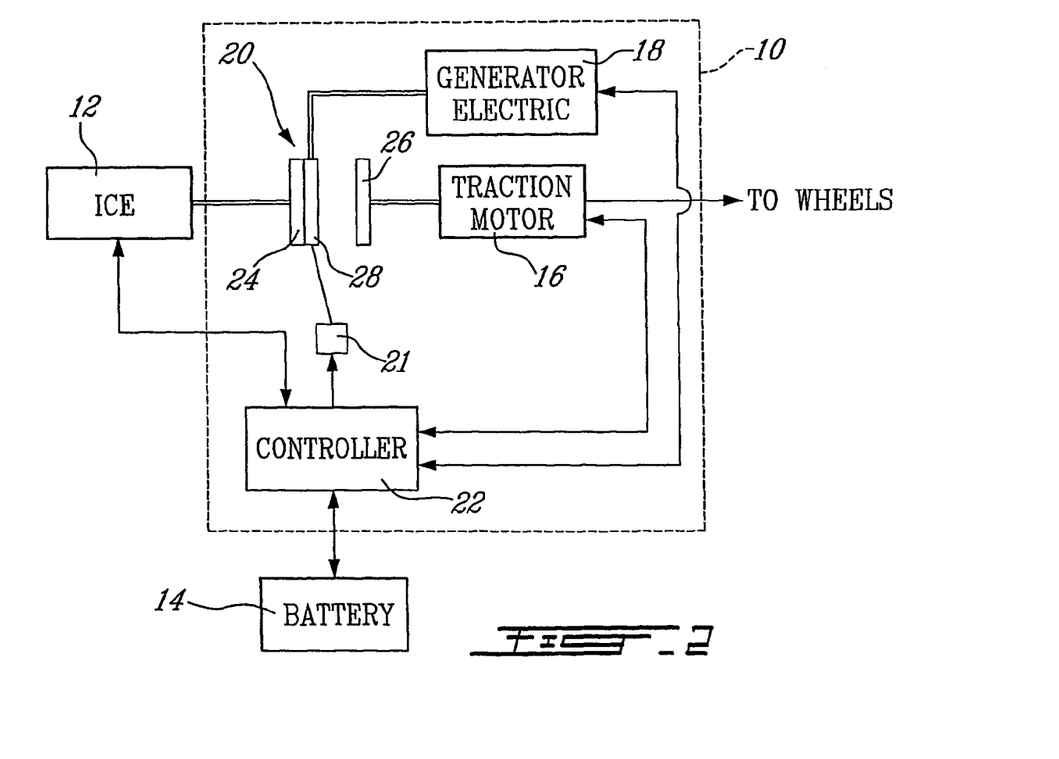
FIG. 2 is a schematic view similar to FIG. 1, illustrating the hybrid drive train in a generation state.

FIG. 2 shows the drive train 10 in an electrical power generation state, i.e. that the shaft of the electric generator is connected to the ICE 12 via the three-position clutch 20. Indeed, the movable disk 28 has been brought in contact with the first disk 24 under the control of the actuating mechanism 21.

As will easily be understood by one skilled in the art, when the drive train 10 is in this state, the rotation of the shaft of the ICE 12 will cause the rotation of the shaft of the electric generator 18. This mechanical energy generated by the ICE 12 may be transformed into electric energy by the electric generator 18 according to known techniques. Since these techniques are believed well known to those skilled in the art, they will not be discussed in greater detail herein.

Figure 3:
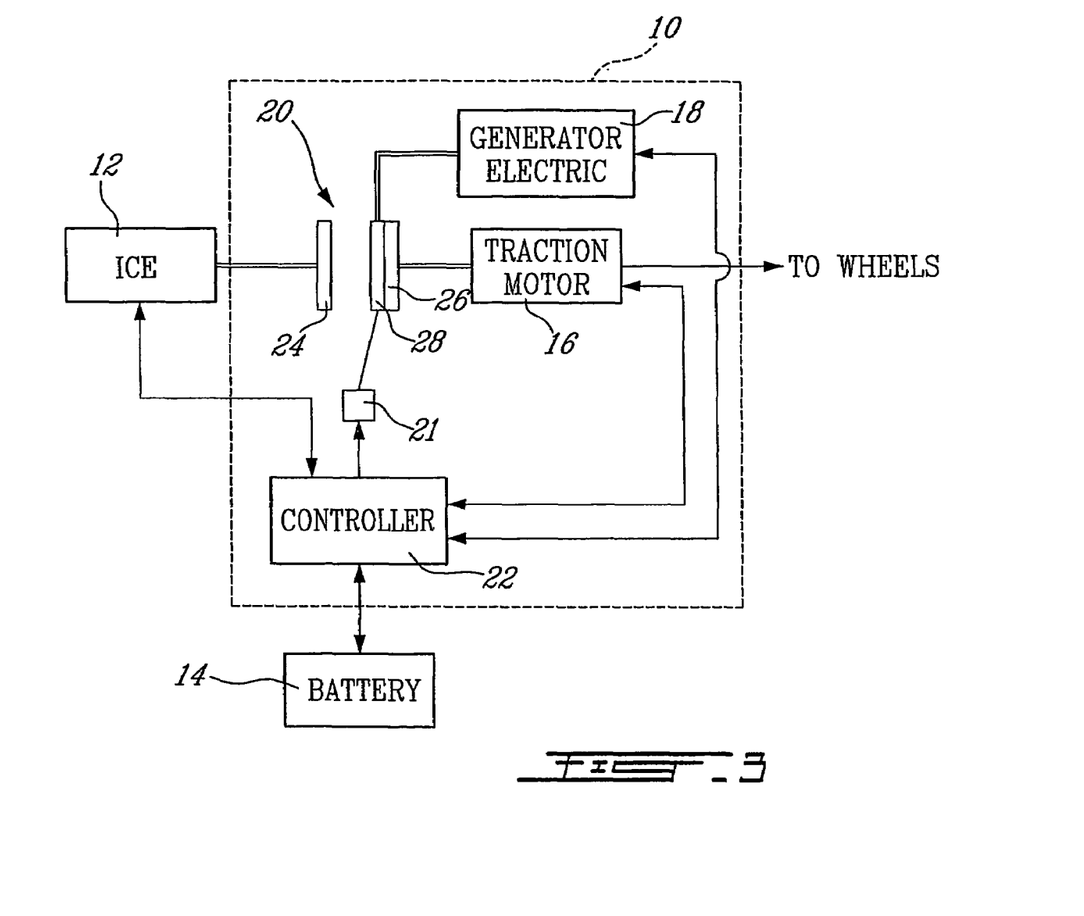
FIG. 3 is a schematic view similar to FIG. 1, illustrating the hybrid drive train in a traction state.

Turning now to FIG. 3 of the appended drawings, the drive train 10 is shown in a mechanical power generating state. Indeed, the movable disk 28 is brought into contact with the second disk 26, therefore linking the shaft of the electric generator 18 and the shaft of the traction motor 16.

When the drive train 10 is in such a mechanical power generating state, the electric generator 18 is used in a motor mode and may generate mechanical power and transfer this mechanical power to the shaft of the traction motor and therefore to the wheels (not shown) of the vehicle.

In other words, the hybrid drive train 10 described herein has three mechanical states. A neutral state where the output/input shaft of the generator 18 is freewheeling (FIG. 1); an electrical power generating state where the output/input shaft of the generator 18 is connected to the output shaft of the ICE 12 (FIG. 2) and a mechanical power generating state where the output/input shaft of the generator 18 is connected to the output shaft of the electric motor 16 (FIG. 3).

As will be understood upon further reading of the present document, the mechanical power generating state of FIG. 3 may also allow regenerative braking.

According to another aspect of the present invention, the controller 22 of the drive train 10 controls the various elements of the drive train so that, from the three mechanical states of the drive train, seven modes are available.

Mode 1: Priority Charge Mode

This is an electrical power generating mode. Accordingly, when the controller 22 determines that this mode is required, the drive train 10 is placed in the electrical power generating state of FIG. 2.

Generally, the priority charge mode is used when the State Of Charge (SOC) of the battery 14 falls below a predetermined value. For example, the controller 22 could be so configured that when the SOC falls below 20%, the priority charge mode is requested.

When the drive train 10 is in the priority charge mode, the electric generator 18 generates as much power as it can to supply as much electrical power as possible to the traction motor and to recharge the battery. Of course, the electrical power generated may be limited by the battery limitations (power and/or current). However, it is possible that, depending on the power rating of the various elements of the drive train, the controller limits the performances of the vehicle for example by limiting the maximum speed, torque and/or power allowed when the drive train is in this mode.

Mode 2: Power Increase Mode

This is an electrical power generating mode. Accordingly, when the controller 22 determines that this mode is required, the drive train 10 is placed in the electrical power generating state of FIG. 2.

This mode is generally used when the controller determines that the electrical power present in the battery 14 is not sufficient to allow the traction motor 18 to develop the required mechanical power, mainly because high performances are demanded of the drive train by the user or because the SOC of the battery is not sufficient to reach the requested performance. The electrical power generated by the electric generator 18 is transferred to the traction motor 18 to supplement the power delivered by the battery 14.

This power increase mode is most often used when the vehicle travels at high speed and the user desires to accelerate, when there is strong head wind or when the vehicle reaches an upward slope.

The level of electrical power generation in the power increase mode may vary. Indeed, the controller 22 may control the electric generator 18 so as to: a) generate the minimum required electrical power, b) generate the maximum electrical power; and c) obtain the best power efficiency.

When the electric generator 18 generates the minimum required electrical power, the goal is to use as little fuel as possible.

When it is desired to keep a minimum adequate level of SOC of the battery 14, the controller 22 controls the electric generator 18 so that it generates the maximum electrical power.

The third option is used when it is desired to maintain the best power efficiency for the drive train.

It is to be noted that the three options of the power increase mode may be automatically selected by the controller 22 or may be selected by the user of the vehicle via user's controls (not shown).

Mode 3: Torque Increase Mode

This is a mechanical power generating mode. Accordingly, when the controller 22 determines that this mode is required, the drive train 10 is placed in the mechanical power generating state of FIG. 3.

This mode is used when the torque required from the drive train 10 is greater than the maximum torque that may be developed by the traction motor 16 alone. Therefore, this mode is most often used when the vehicle starts, when a strong acceleration is requested by the user, when there is strong head wind or when the vehicle reaches an upward slope.

The level of mechanical power generation in the torque increase mode may vary. Indeed, the controller 22 may control the electric generator 18 so as to: a) prevent excessive overheating of the various elements of the traction motor 16; or b) obtain the best overall power efficiency.

In the first case, temperature sensors (not shown) may be installed to monitor the temperature of various elements of the traction motor 16 and of the electric generator 18. Depending on the data supplied by these sensors, the controller 22 may determine the amount of torque to be generated by the traction motor 16 and by the electric generator 18 to prevent overheating.

When the controller determines that there is no overheating, for example when the speed of the vehicle is constant, the controller may determine that the required torque may be split between the traction motor 16 and the electric generator 18. One skilled in the art will be in a position to determine the adequate ratio.

Mode 4: Normal Charge Mode

This is an electrical power generating mode. Accordingly, when the controller 22 determines that this mode is required, the drive train 10 is placed in the electrical power generating state of FIG. 2.

Generally, the normal charge mode is used when the SOC of the battery 14 falls below a predetermined value that is greater that the value of the SOC that dictates the priority charge mode described hereinabove. For example, the controller 22 could be so configured that when the SOC falls below 40%, the normal charge mode is requested.

It is to be noted that the electrical power generated by the electric generator 18 may vary when the drive train 10 is in the normal charge mode. On the one hand, if the battery is to be charged as fast as possible, the electric generator 18 is so controlled as to supply as much electric power as possible. On the other hand, the amount of fuel may be minimized by selecting a more efficient level of electrical power generation. Alternatively, the controller may allow a quiet mode where the ICE 12 is operated at a level that is a function of the ground speed of the vehicle to thereby minimize the noise perceived by the user.

It is to be noted that the three options of the normal charge mode may be automatically selected by the controller 22 or may be selected by the user of the vehicle via user's controls (not shown).

Mode 5: Torque Sharing Mode

This is a mechanical power generating mode. Accordingly, when the controller 22 determines that this mode is required, the drive train 10 is placed in the mechanical power generating state of FIG. 3.

In some instances, it may then be desirable to place the drive train 10 in the torque sharing mode and dynamically split the requested torque between the traction motor 16 and the electric generator 18. For example, it has been found that this torque splitting is efficient when the torque developed by the traction motor 16 is about its nominal torque and the torque developed by the electric generator 18 is about its nominal torque.

This mode may also be used when the temperature of the traction motor 18, or one of its associated components, exceeds a predetermined value.

It is to be noted that the ratio of torque requested from the traction motor 16 and the electric generator 18 may vary without going over the maximum torque rating, for example depending on the temperature reading of these elements. Alternatively, the ratio may be fixed at their nominal torque so as to yield the best drive train efficiency.

Mode 6: Power Sharing Mode

This is an electrical power generating mode very similar to the power increase mode described hereinabove. Accordingly, when the controller 22 determines that this mode is required, the drive train 10 is placed in the electrical power generating state of FIG. 2.

The Power Sharing Mode is generally used to increase the life of the battery by dividing the electric power required by the traction motor between the battery and the electric generator.

One skilled in the art will understand that to increase the life of the battery, it is best not to draw more power than the optimum power available. The optimum power of the battery changes from one battery technology to another and usually decreases with the SOC of the battery. Accordingly, an optimum power curve with respect to the SOC is entered in the controller.

The Power Sharing Mode is therefore used when the power requested by the drive train is greater than the optimum power available from the battery.

It is to be noted that when the drive train is in this mode, the controller aims at preventing the drive train from falling to the priority charge mode level of SOC. Therefore, the electric generator is so controlled that it generates the maximum electric power possible.

Mode 7: Neutral Mode

This is the default state of the drive train 10. When the controller 22 determines that the drive train 10 is to be placed in this mode, it places the clutch 20 in its neutral state illustrated in FIG. 1.

It is to be noted that, in some cases, when the clutch 20 is in the electric power generating state and has to be changed to the mechanical power generating state, or vice-versa, the clutch 20 is advantageously first placed in its neutral state to prevent any undesired sensations to the driver and to limit the mechanical stress of the drive train.

It is to be noted that the user controls may include an optional mode selector (not shown) to allow the driver to request any of the modes described hereinabove manually.

Figure 4:
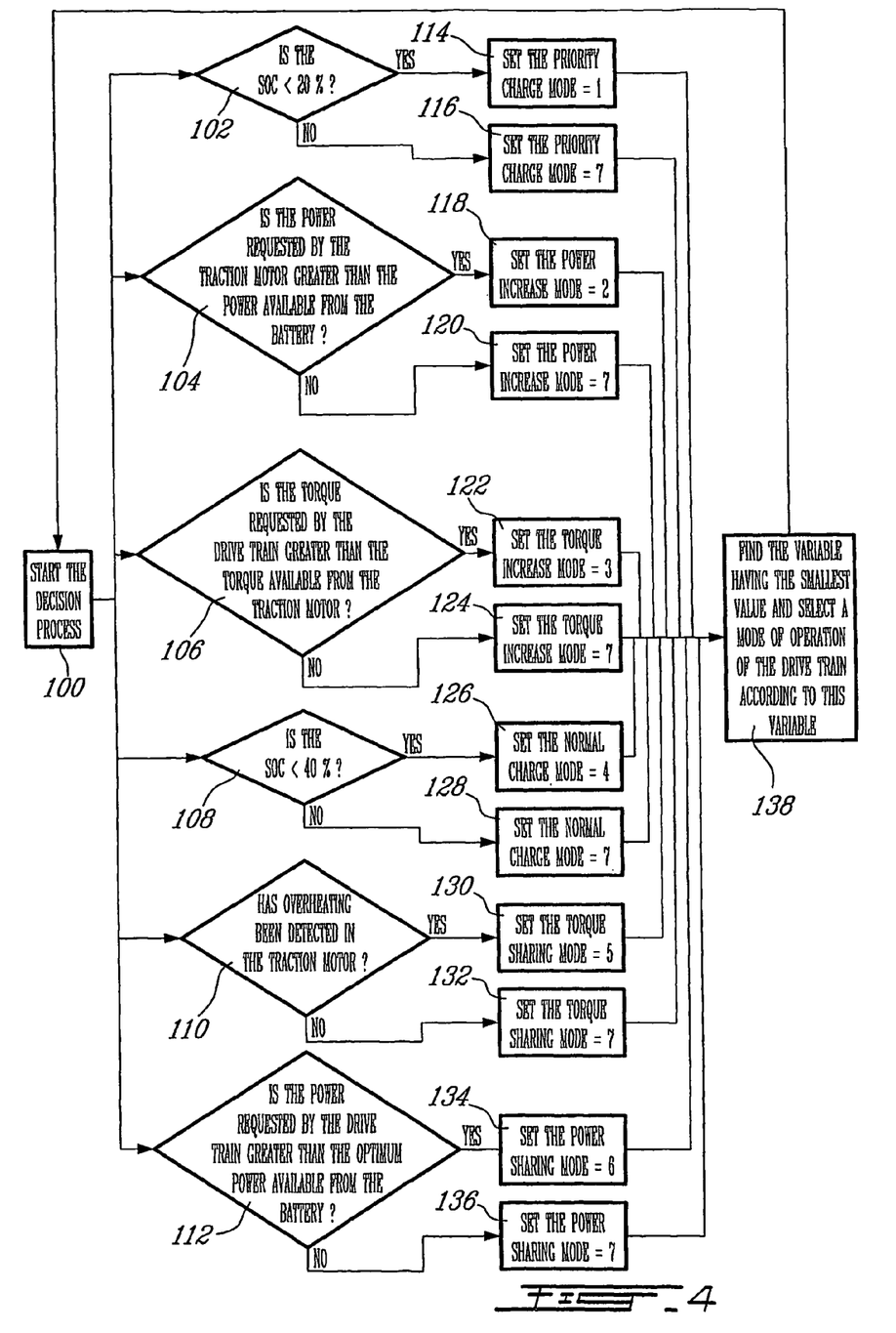
FIG. 4 is an exemplary schematic flowchart of various modes of operation of the hybrid drive train of FIG. 1.

FIG. 4 of the appended drawings illustrates a schematic block diagram of the seven modes described hereinabove and their priority, according to an aspect of the present invention. This block diagram will be used hereinbelow to describe a control method of the drive train 10 according to an embodiment of the present invention. As will easily be understood by one skilled in the art, this control method may be implemented by the controller 22.

Generally stated, after the decision process is started, the method separately tests the seven modes to determine all the modes that are adequate. These tests are made in parallel and the results are then compared to determine which mode should be selected.

Step 100 is the start of the decision process. Then, in steps 102 to 112, the controller determines all the modes that are adequate depending on the various characteristics of the vehicle.

For each non-neutral mode, a variable is set to a predetermined value if the method determines that the mode is adequate and if set to the value seven (7) if the method determines that the mode is not adequate.

Accordingly:
- the variable "Priority Charge Mode" is set to one (1) if the method determines that the SOC is below 20% (step 114); if not this variable is set to seven (7) (step 116);
- the variable "Power Increase Mode" is set to two (2) if the method determines that the power requested by the traction motor is greater than the power available from the battery (step 118); if not this variable is set to seven (7) (step 120);
- the variable "Torque Increase Mode" is set to three (3) if the method determines that the torque requested by the drive train is greater than the torque available from the traction motor (step 122); if not this variable is set to seven (7) (step 124);
- the variable "Normal Charge Mode" is set to four (4) if the method determines that the SOC is below 40% (step 126); if not this variable is set to seven (7) (step 128);
- the variable "Torque Sharing Mode" is set to five (5) if the method determines that overheating has been detected in the traction motor (step 130); if not this variable is set to seven (7) (step 132); and
- the variable "Power Sharing Mode" is set to six (6) if the method determines that the power requested by the drive train is greater than the optimum power available from the traction motor (step 134); if not this variable is set to seven (7) (step 136).

Finally, in step 138, the method selects and activates a mode of operation of the drive train by finding the variable that has the lowest value. Then, the method returns to step 100.

It is to be noted that the percentages of the SOC given herein are example only and that these percentages can be changed depending on the performance requirements of the vehicle and the power rating of the different elements of the vehicle, for example.

As will easily be understood by one skilled in the art, the selection method described hereinabove is interesting since, to change the priority between the different modes during the design stage of the drive train, one simply has to change the values given to the variables when the corresponding modes are found adequate. Of course, these values could be changed after the design stage, if necessary.

Of course, one skilled in the art will understand that other control strategies could be used. For example, instead of doing the decision process as a parallel process as described hereinabove, it could be done in series, by using a IF-THEN-ELSE strategy, for example.

A possible modification to the control method presented hereinabove would be to treat the Power Increase Mode (Mode 2) and the Torque Increase Mode (Mode 3) as optional modes that would be manually triggered by the user. More specifically, the user's control of the vehicle could include a "Sports" button that, when depressed would enable these two modes.

Figure 5:
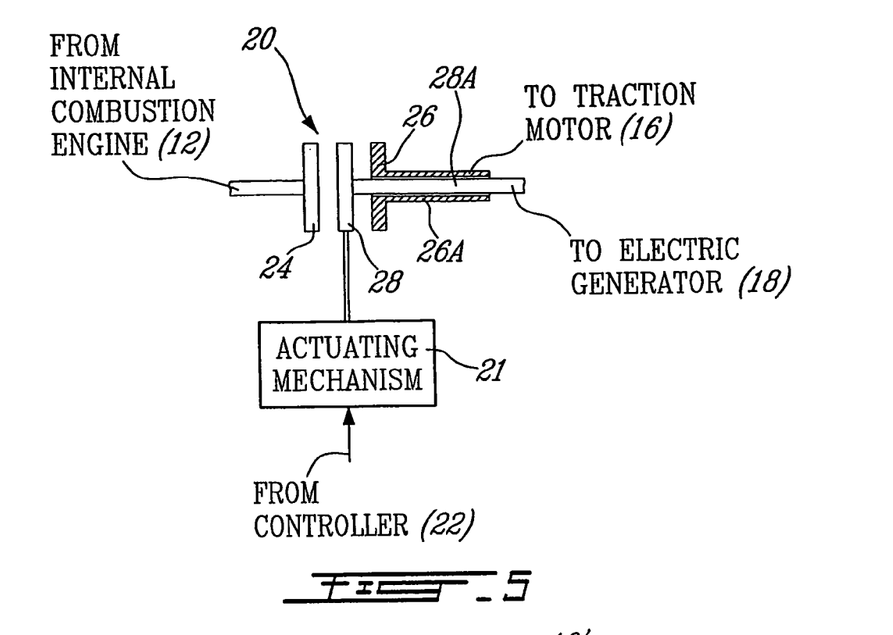
FIG. 5 is a schematic view illustrating a possible arrangement of the various elements of the clutch used in the drive train of FIG. 1.

Turning now to FIG. 5 of the appended drawings, a schematic representation of a three-position clutch 20 according to an aspect of the present invention will be described.

As can be seen from this figure, the shafts 26A and 28A, respectively linked to the second disk 26 and the movable disk 28 are concentric. Accordingly, since shaft 28A can telescopically slide into shaft 26A, the movable disk 28 may be moved by the actuating mechanism 21 while remaining linked to the electric generator 18. One skilled in the art will have no problem linking the shaft 28A to the electric generator 18 and the shaft 26A to the traction motor 16.

Alternatively, in another configuration (not shown), shafts associated with the electric generator 18 and with the ICE 12 could be concentric to yield similar results.

Figure 6:
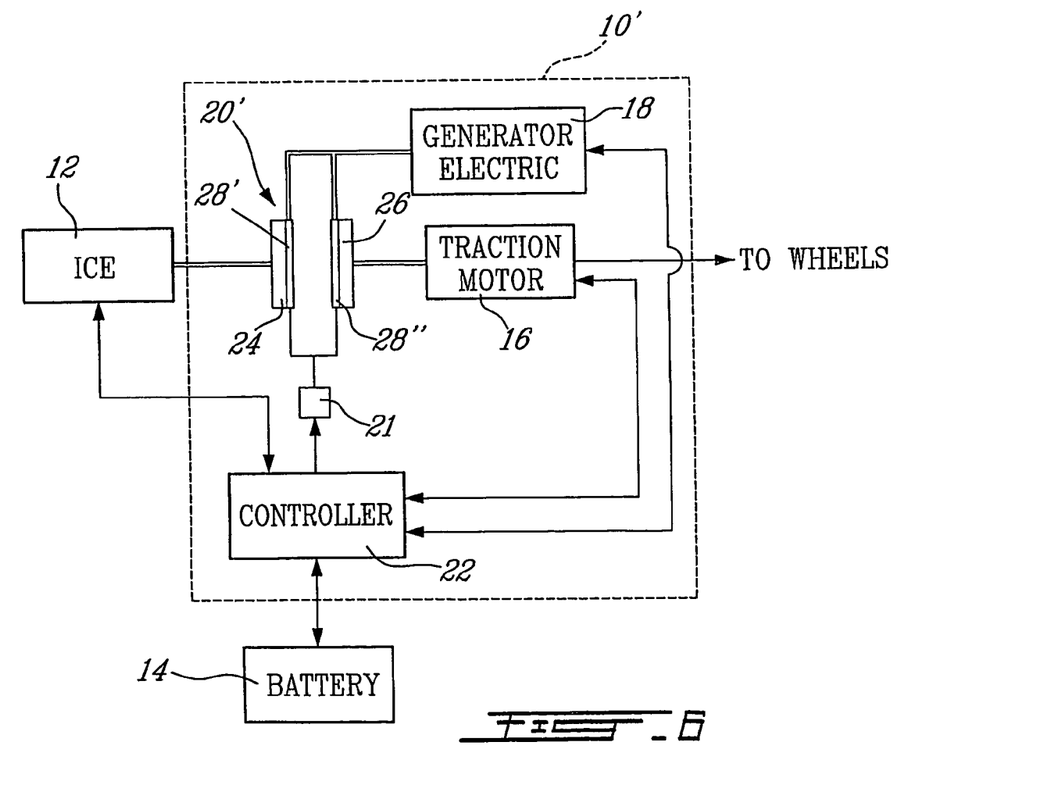
FIG. 6 is a schematic view of a hybrid drive train according to a second embodiment of the present invention, shown in a parallel mode.

Turning now to FIG. 6 of the appended drawings, a drive train 10' according to an alternative embodiment of the present invention will be described. Since the drive train 10' is very similar to the drive train 10 described hereinabove with reference to FIGS. 1 to 3, only the differences between these drive trains will be described.

The main difference between the drive train 10 of FIG. 1 and the drive train 10' of FIG. 6 concerns the clutch. Indeed, while the clutch 20 of FIG. 1 is a three-position clutch, the clutch 20' of FIG. 6 is a four-position clutch. Indeed, while clutch 20' may be positioned in the three positions illustrated in FIGS. 1 to 3, a fourth position, illustrated in FIG. 6, is also possible.

This fourth position allows the electric generator 18 to be simultaneously connected to both the ICE 12 and to the traction motor 16. Accordingly, this enables a parallel hybrid mode where at least a portion of the mechanical power can be transferred from the ICE 12 to the wheels of the vehicle through the two-part (28' and 28") movable disk.

One skilled in the art will understand that the two parts 28' and 28" of the two-part movable disk may be engaged to one another to realize the three states illustrated in FIGS. 1 to 3.

It is to be noted that while the three-position clutch has been described hereinabove as a generic clutch, a conventional friction clutch, a jaw clutch or other clutch technologies could be used.

It is to be noted that while the power rating of the various elements of the drive train 10 have not been specified herein, it is believed that one skilled in the art of hybrid drive trains would have no problem selecting or designing the appropriate elements according to the desired performances of the vehicle.

It is mentioned hereinabove that some of the modes may be controlled so as to improve efficiency. However, no exact indication of the method of control required to obtain such an improved efficiency is given since the efficiency level is dependent on the power rating and other characteristics of the various elements of the drive train 10. One skilled in the art will be in a position to configure the controller 22 according to the elements used in the drive train to yield the best efficiency.

It is to be noted that while the traction motor 16 is primarily designed to drive the wheels of the vehicle, when the vehicle is decelerating, the traction motor 16 may also be used as an electric generator to recuperate energy and store it in the batteries.

It is also to be noted that while the engine has been described as being an internal combustion engine, other types of engine could be used.

Although the present invention has been described hereinabove by way of preferred embodiments thereof, it can be modified, without departing from the spirit and nature of the subject invention as defined in the appended claims.

What is claimed is:

1. A hybrid drive for a vehicle including at least one driving wheel; said hybrid drive comprising:
   an engine having an output shaft;
   an electric motor having an output shaft connected to the at least one driving wheel;
   an electric motor/generator having an output/input shaft concentrically and rotatably mounted in one of said output shaft of said electric motor and said output shaft of said engine;
   a clutch assembly selectively interconnecting said output/input shaft of said electric motor/generator to said output shaft of said engine and to said output shaft of said electric motor; said clutch assembly including a first disk connected to the output shaft of the electric motor, a second disk connected to the output shaft of the engine, a movable disk connected to the output/input shaft of the electric motor/generator, and an actuating mechanism associated with the movable disk, said movable disk being actuatable between a first position where said movable disk is connected to said first disk, a second position where said movable disk is connected to said second disk, and a third position where said movable disk is freewheeling;
   a controller so connected to said electric motor, said electric motor/generator and said clutch assembly as to control their operation.

2. The hybrid drive of claim 1, wherein said engine is an internal combustion engine.

3. The hybrid drive of claim 1, wherein said electric motor is an external rotor electric motor.

4. The hybrid drive of claim 1, wherein said electric motor/generator is an external rotor electric motor.

5. The hybrid drive of claim 1, wherein said actuating mechanism is an electromagnetic mechanism.

6. The hybrid drive of claim 1, wherein said clutch assembly is a jaw clutch.

7. The hybrid drive of claim 1, wherein said clutch assembly is selected from the group consisting of a friction clutch and a jaw clutch.

8. A hybrid drive for a vehicle including at least one driving wheel and an engine having an output shaft; said hybrid drive comprising:
   an electric traction motor having an output shaft connected to the at least one driving wheel;
   an electric motor/generator having an output/input shaft concentrically and rotatably mounted in one of said output shaft of said electric motor and said output shaft of said engine;
   a clutch assembly selectively interconnecting said output/input shaft of said electric motor/generator to the output shaft of the engine and to said output shaft of said electric motor; said clutch assembly including a first disk connected to the output shaft of the electric traction motor, a second disk connected to the output shaft of the engine, a movable disk connected to the output/input shaft of the electric motor/generator, and an actuating mechanism associated with the movable disk, said movable disk being actuatable between a first second position where said movable disk is connected to said first disk, a second position where said movable disk is connected to the second disk, and a third position where said movable disk is freewheeling; and
   a controller so connected to said electric motor, said electric motor/generator and said clutch assembly as to control their operation.

9. The hybrid drive of claim 8, wherein said electric traction motor is an external rotor electric motor.

10. The hybrid drive of claim 8, wherein said electric motor/generator is an external rotor electric motor.

11. The hybrid drive of claim 8, wherein said actuating mechanism is an electromagnetic mechanism.

12. The hybrid drive of claim 8, wherein said clutch assembly is a jaw clutch.

13. The hybrid drive of claim 8, wherein said clutch assembly is selected from the group consisting of a friction clutch and a jaw clutch.

14. A clutch assembly for a hybrid drive of a vehicle including at least one driving wheel, an engine having an output shaft, an electric motor having an output shaft associated with the at least one driving wheel, an electric motor/generator having an output/input shaft concentrically and rotatably mounted in one of said output shaft of said electric motor and said output shaft of said engine and a controller so connected to the electric motor, the electric motor/generator and said clutch assembly as to control their operation; said clutch assembly selectively interconnecting the output/input shaft of the electric motor/generator to the output shaft of the engine and to the output shaft of the electric motor; said clutch assembly including a first disk connected to the output shaft of the electric motor, a second disk connected to the output shaft of the engine, a movable disk connected to the output/input shaft of the electric motor/generator, and an actuating mechanism associated with the movable disk, said movable disk being actuatable between a first position where the movable disk is connected to the first disk, a second position where the movable disk is connected to the second disk, and a third position where the movable disk is freewheeling.

15. The clutch assembly of claim 14, wherein said actuating mechanism is an electromagnetic mechanism.

16. The clutch assembly of claim 14, wherein said clutch assembly is a jaw clutch.

17. The clutch assembly of claim 14, wherein said clutch assembly is selected from the group consisting of a friction clutch and a jaw clutch.

18. A method for operating a drive train of a hybrid vehicle provided with user controls, an ICE having an output shaft, a traction motor having an output shaft connected to a driving wheel, an electric generator having an output/input shaft concentrically and rotatably mounted in one of said output shaft of said traction motor and said output shaft of said ICE and a clutch assembly including a first disk connected to the output shaft of the traction motor, a second disk connected to the output shaft of the ICE, a movable disk connected to the output/input shaft of the electric generator, and an actuating mechanism associated with the movable disk; said method including the steps of:
provided a controller connected to the user controls to receive data therefrom, to the ICE and to the clutch assembly;
providing at least one sensor for sensing at least one characteristic of the hybrid vehicle; the at least one sensor supplying sensed data to the controller; and
via the controller, controlling the actuating mechanism so as to move the movable disk between a first position where the movable disk is associated with the first disk, a second position where the movable disk is associated with the second disk and a third position where the movable disk is freewheeling, depending on the data supplied from the at least one sensor and from the user controls.

19. The method of claim 18, wherein said at least one characteristic is selected from the group consisting of the SOC of a battery, the power available from the battery, the torque available from the traction motor, the temperature of the traction motor and the optimum power available from the battery.

20. The method of claim 18, wherein, in said controlling step, the controller controls the drive train so as to generate a plurality of modes of operation of the drive train.

21. The method of claim 20, wherein the plurality of modes are selected from the group consisting of a Priority Charge Mode, a Power Increase Mode, a Torque Increase Mode, a Normal Charge Mode, a Torque Sharing Mode, a Power Sharing Mode and a Neutral Mode.

22. The hybrid drive of claim 1, wherein the moveable disk is a two-part movable disk.

23. The hybrid drive of claim 22, wherein the two-part movable disk includes:
a first part actuatable by said actuating mechanism between a first part first position where said first part is connected to the first disk and a first part second position where said first part is freewheeling; and
a second part actuatable by said actuating mechanism between a second part first position where said second part is connected to said second disk and a second part second position where said second part is freewheeling.

24. The hybrid drive of claim 8, wherein the moveable disk is a two-part movable disk.

25. The hybrid drive of claim 24, wherein the two-part movable disk includes:
a first part actuatable by said actuating mechanism between a first part first position where said first part is connected to the first disk and a first part second position where said first part is freewheeling; and
a second part actuatable by said actuating mechanism between a second part first position where said second part is connected to said second disk and a second part second position where said second part is freewheeling.

26. The hybrid drive of claim 14, wherein the moveable disk is a two-part movable disk.

27. The hybrid drive of claim 26, wherein the two-part movable disk includes:
a first part actuatable by said actuating mechanism between a first part first position where said first part is connected to the first disk and a first part second position where said first part is freewheeling; and
a second part actuatable by said actuating mechanism between a second part first position where said second part is connected to said second disk and a second part second position where said second part is freewheeling.

28. The method of claim 18, wherein controlling the clutch assembly also includes controlling the clutch assembly so as to interconnect the movable disk to both the first and second disks, depending on the data supplied from the at least one sensor and from the user controls.

29. A hybrid drive for a vehicle including at least one driving wheel; said hybrid drive comprising:
an engine having an output shaft;
an electric motor having an output shaft connected to the at least one driving wheel;
an electric motor/generator having an output/input shaft;
a clutch assembly selectively interconnecting said output/input shaft of said electric motor/generator to said output shaft of said engine and to said output shaft of said electric motor; said clutch assembly including a first disk connected to the output shaft of the electric motor, a second disk connected to the output shaft of the engine, a movable disk connected to the output/input shaft of the electric motor/generator, and an actuating mechanism associated with the movable disk, said movable disk being actuatable between a first position where said movable disk is connected to said first disk, a second position where said movable disk is connected to said second disk, and a third position where said movable disk is freewheeling;
a controller so connected to said electric motor, said electric motor/generator and said clutch assembly as to control their operation,
wherein the moveable disk is a two-part movable disk comprising:
a first part actuatable by said actuating mechanism between a first part first position where said first part is connected to the first disk and a first part second position where said first part is freewheeling; and
a second part actuatable by said actuating mechanism between a second part first position where said second part is connected to said second disk and a second part second position where said second part is freewheeling.

30. A hybrid drive for a vehicle including at least one driving wheel and an engine having an output shaft; said hybrid drive comprising:
an electric traction motor having an output shaft connected to the at least one driving wheel;
an electric motor/generator having an output/input shaft;
a clutch assembly selectively interconnecting said output/input shaft of said electric motor/generator to the output shaft of the engine and to said output shaft of said electric motor; said clutch assembly including a first disk connected to the output shaft of the electric traction motor, a second disk connected to the output shaft of the engine, a movable disk connected to the output/input shaft of the electric motor/generator, and an actuating mechanism associated with the movable disk, said movable disk being actuatable between a first position where said movable disk is connected to said first disk, a second position where said movable disk is connected to the second disk, and a third position where said movable disk is freewheeling; and
a controller so connected to said electric motor, said electric motor/generator and said clutch assembly as to control their operation, wherein the moveable disk is a two-part movable disk comprising:
  a first part actuatable by said actuating mechanism between a first part first position where said first part is connected to the first disk and a first part second position where said first part is freewheeling; and
  a second part actuatable by said actuating mechanism between a second part first position where said second part is connected to said second disk and a second part second position where said second part is freewheeling.

31. A clutch assembly for a hybrid drive of a vehicle including at least one driving wheel, an engine having an output shaft, an electric motor having an output shaft associated with the at least one driving wheel, an electric motor/generator having an output/input shaft and a controller so connected to the electric motor, the electric motor/generator and said clutch assembly as to control their operation; said clutch assembly selectively interconnecting the output/input shaft of the electric motor/generator to the output shaft of the engine and to the output shaft of the electric motor; said clutch assembly including a first disk connected to the output shaft of the electric motor, a second disk connected to the output shaft of the engine, a movable disk connected to the output/input shaft of the electric motor/generator, and an actuating mechanism associated with the movable disk, said movable disk being actuatable between a first position where the movable disk is connected to the first disk, a second position where the movable disk is connected to the second disk, and a third position where the movable disk is freewheeling,
  wherein the movable disk is a two-part movable disk comprising:
    a first part actuatable by said actuating mechanism between a first part first position where said first part is connected to the first disk and a first part second position where said first part is freewheeling; and
    a second part actuatable by said actuating mechanism between a second part first position where said second part is connected to said second disk and a second part second position where said second part is freewheeling.

* * * * *

UNITED STATES PATENT AND TRADEMARK OFFICE
CERTIFICATE OF CORRECTION

PATENT NO. : 7,641,583 B2
APPLICATION NO. : 10/555201
DATED : January 5, 2010
INVENTOR(S) : Houle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 761 days.

Signed and Sealed this

Sixteenth Day of November, 2010

David J. Kappos
*Director of the United States Patent and Trademark Office*